Aug. 18, 1925.         C. C. HOLLIDGE         1,550,256

COMMERCIAL FORM

Filed Feb. 14, 1924      2 Sheets-Sheet 1

Fig. 1.

Number to correspond to your check book.

TREMONT AT TEMPLE PLACE.   —13   NO. _____

Drawn _____ 19

11

Pay to the order of  C. CRAWFORD HOLLIDGE.  $ _____

_____ Dollars.    —7

TO _____
Fill in name of your bank.

_____
Place your signature here.

- - - - Detach and return in the enclosed envelope - - - -    —9

| DATE | ITEMS. | CHARGES | CREDITS. | BALANCE. |
|------|--------|---------|----------|----------|
|      |        |         |          |          |
|      |        |         |          |          |

—5

Inventor:
Clarence Crawford Hollidge.
Emery, Booth, Janney & Varney
Attys

Aug. 18, 1925.
C. C. HOLLIDGE
COMMERCIAL FORM
Filed Feb. 14, 1924
1,550,256
2 Sheets-Sheet 2
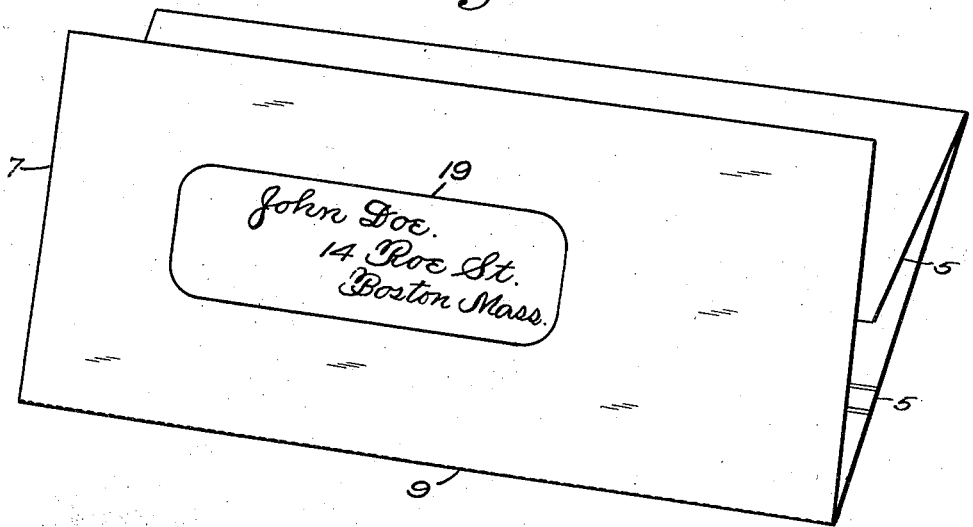
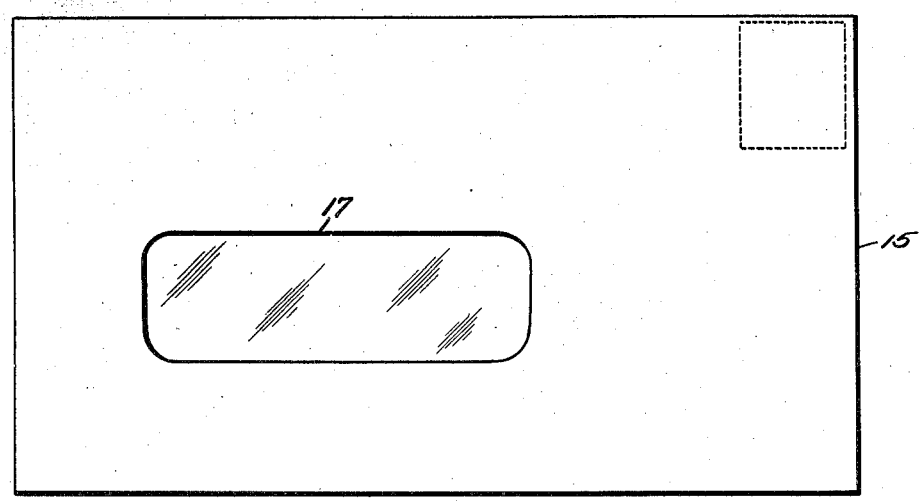

Patented Aug. 18, 1925.

1,550,256

UNITED STATES PATENT OFFICE.

CLARENCE CRAUFORD HOLLIDGE, OF MILTON, MASSACHUSETTS.

COMMERCIAL FORM.

Application filed February 14, 1924. Serial No. 692,702.

*To all whom it may concern:*

Be it known that I, CLARENCE C. HOLLIDGE, a citizen of the United States, and a resident of Milton, county of Norfolk, and State of Massachusetts, have invented an Improvement in Commercial Forms, of which the following description, in connection with the accompanying drawings, is a specification, like characters on the drawings representing like parts.

This invention relates to commercial forms and the particular object is to provide an improved form to be used by a merchant in rendering bills or statements of account to his customers which will be of superior convenience both to the merchant and to his debtor, which will promote the good will of the merchant and which will speed up collections.

My invention may best be understood by reference to the following description of the illustrative embodiment thereof shown by way of example in the accompanying drawing, wherein:

Fig. 1 is a face view of the statement blank unfolded;

Fig. 2 is a view of the blank folded ready for insertion in an envelope; and

Fig. 3 is a view of a window envelope in which the statement may be transmitted if desired.

The bill or statement form herein shown is printed on a suitable sheet of paper and the face thereof displays two portions, a portion 5, which may be suitably ruled and lettered, and which is adapted to receive the usual itemization or statement of account proper and an end portion 7 which in the embodiment of the invention shown is the upper end portion and corresponds to the usual letter-head or bill-head and which may be readily separated from the portion 5 along a transverse line 9 which may be perforated or otherwise weakened.

As indicated by the typical letter-press shown in Fig. 1, the end portion 7 of the blank constitutes an uncompleted check in which the debtor is named as payee. This check may be printed in such striking or artistic form as is consistent with its utilitarian purpose displaying prominently and in an attractive manner the name 11 of the merchant and, if desired, some trade-mark or similar design 13.

When the debtor receives a statement, which is preferably forwarded with a return envelope, he may immediately fill out the check, detach it from the main statement 5 which he retains as a voucher and return it as a payment of the account stated. This provision of a check leads to a prompt settlement of the account as the debtor will probably immediately sign and return the check which is sent him instead of postponing payment until a later season when it will be more convenient for him to procure one of his own check blanks. Such postponement in practice considerably delays payments of accounts by persons of ample means and who have no intention of not promptly settling their bills. As the payee's name is printed, no error can be made in this.

The provision of the detachable check as a transverse end portion of the statement blank and separable along the transverse line 9 provides a blank form of seemly and customary appearance, and of a suitable width to be received in the customary envelope without vertical folding. The form may be made of any convenient length or in several lengths to give greater or less capacity to the portion 5 without altering the size of the check portion 7. When the form is withdrawn from its envelope and unfolded by the recipient the check blank, merchant's name and his trade-mark or the like are displayed and read right side up in the customary manner. As is obvious from Fig. 1, the check may be completed or filled out without detaching it from the statement portion 5 and with this portion 5 right side up in its ordinary legible position for convenient reference.

In the form of the invention shown, wherein the check blank 7 is the upper end of the statement, this check serves the purpose of the customary letter-head or bill-head as well as the purpose of a check blank. It has all the functions of identifying the sender and displaying his name in an attractive manner which the usual letter-head or bill-head may have and when these purposes are fulfilled, it provides a check form which the debtor may conveniently use in paying the account.

It will be clear that when the check blank 7 forms an end portion of the form as a whole the latter may be folded up along transverse lines in the customary manner with the portion 7 constituting an overlying flap. This provides a convenient manner of forwarding the statement, if desired, in a window envelope 15 such as is shown in Fig. 3, while attaining also certain additional advantages. The back of the portion 7 may have inscribed thereon as shown in Fig. 2 the name and address of the debtor, this being done in such manner as to leave free the usual space for endorsement of the check and when the form is placed in the window envelope 15, this address will show through the window 17. A suitable marking as 19 (Fig. 2) may be printed on the back of the portion 7, if desired, to facilitate the proper location of the name and address so that it will show through the window 17. This name and address on the back of the check does not complicate the face thereof in any way yet will serve as an identification of the signature of the debtor and may be otherwise convenient in the bookkeeping routine of the creditor. It also permits the payment of the bill to be made from a bank account other than that of the debtor without causing confusion.

While my invention is not in any way limited to such a construction, I prefer not to have the name of the debtor appear in any way on the face of the check form 7 as this may lead to misunderstanding and the omission of the real signature when the check is returned.

I have described in detail one particular form of my invention shown by way of example in the accompanying drawings. The form and arrangement of parts and the nature of the letter-press used may, of course, be widely varied from those of the example illustrated without departing from the spirit of the invention.

What I claim as new and desire to secure by Letters Patent I shall express in the following claims:

1. A form for use by a creditor in rendering a statement of account comprising a sheet including on its face a portion to receive an itemization or statement proper and a portion constituting an uncompleted check drawn to the order of the creditor, the two being separable along a transverse line, at least the principal letter-press of the check, including the name of the creditor-payee, extending in transverse lines whereby it is presented to view in customary manner when the statement is unfolded or withdrawn from its envelope and may be completed while still connected to the statement portion with the latter right side up and conveniently legible.

2. A statement form comprising a space to receive details of an account and a head therefor consisting of the upper end portion of the sheet, said head separable from the body of the sheet along a transverse line and displaying the name of and identifying the creditor in the form of an uncompleted check expressed as payable to the creditor.

3. A form for use by a creditor in rendering a statement of account comprising a sheet including a portion to receive details of an account and an end portion separable along a transverse line, the face thereof constituting an uncompleted check drawn to the order of the creditor and the back having an indication for locating the name of the debtor whereby the sheet folded with said end portion as an overlying flap may be transmitted in a window envelope and the name will afterwards serve as an identification of signature.

In testimony whereof, I have signed my name to this specification.

CLARENCE CRAUFORD HOLLIDGE.